Sept. 1, 1931.　　　W. G. WILSON　　　1,821,866
FLUID TIGHT JOINT AND METHOD OF MAKING
Filed Nov. 1, 1929
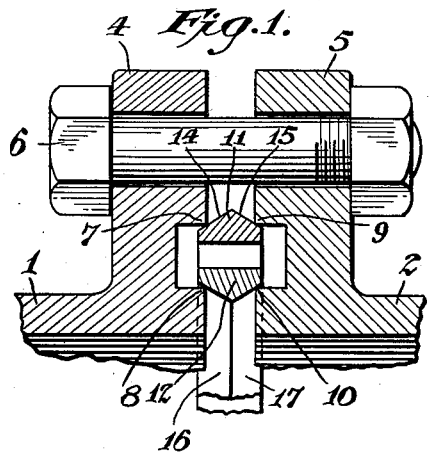
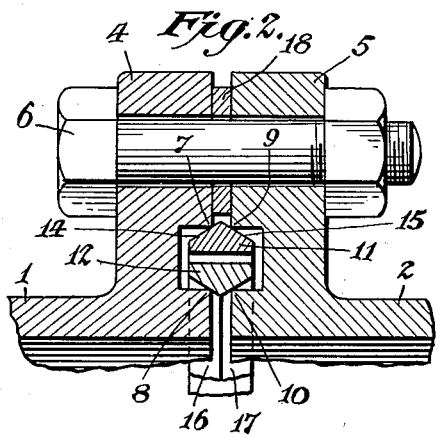
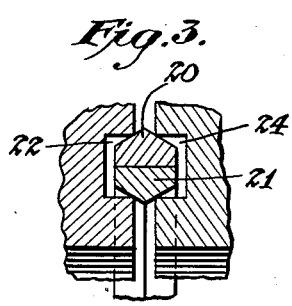
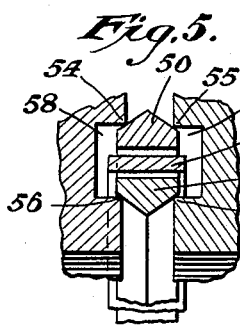
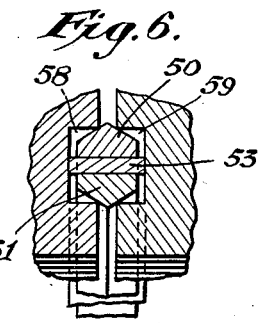
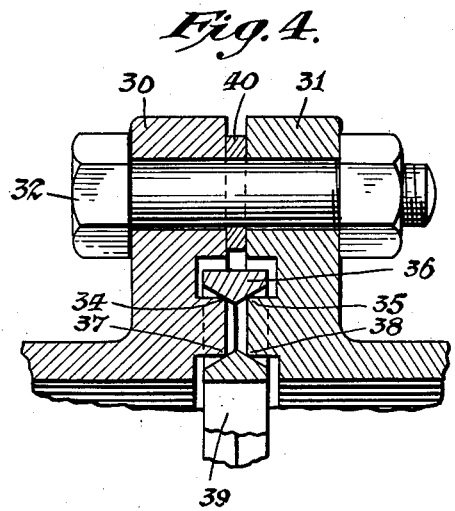
Inventor
Wylie G. Wilson
By his Attorney Patented Sept. 1, 1931

1,821,866

UNITED STATES PATENT OFFICE

WYLIE G. WILSON, OF ELIZABETH, NEW JERSEY

FLUID TIGHT JOINT AND METHOD OF MAKING

Application filed November 1, 1929. Serial No. 403,979.

This invention relates to a fluid tight joint and to the method of making the same. The joint is particularly useful in connecting together sections of metal pipe used to transmit fluids under pressure and hence it will be disclosed in that connection. It will be obvious, however, that the invention may be used for other purposes.

Heretofore in the art pipes have usually been joined by simple threaded sleeves, or by constructions involving more or less plastic gaskets or accurately ground abutting surfaces. Simple threaded sleeves are not customarily used for large sizes of pipe because of the difficulty of making a leak-tight joint and the difficulty of rotating the pipe in making the joint; also joints made with simple threaded sleeves have a rough interior, and the relative position of the two sections of pipe cannot be accurately predetermined. Gaskets of more or less plastic material are apt to be blown out by high pressure; they deteriorate with age and heat; and in many cases great force must be used in clamping together the parts with which the gasket is associated. Also with this type of joint the relative position of the two sections of pipe cannot be accurately predetermined because of variations in thickness and variations in compressibility of the gasket. Accurately ground abutting surfaces are expensive to manufacture; it is difficult to construct them to hold high pressures; and such joints are not suitable for many purposes. Other types of joints have been proposed, but the types above referred to are the ones most extensively used.

The general object of the present invention is to provide a joint structure and/or method of making a joint which will be reliable and permanently fluid tight against high pressures and can be manufactured at low cost by ordinary commercial methods.

Another object of the invention is to provide a joint structure and/or method of making a joint which will withstand high fluid pressure without requiring greater manufacturing precision or greater care in assembly than is involved in ordinary commercial work.

Another object of the invention is to provide a joint structure in which relatively high sealing pressures may be obtained with the use of relatively small forces in assembling the parts.

Another object of the invention is to provide for automatic alignment of the pipes or the like to be joined without any special care in assembly.

Other objects of the invention will be obvious from the following disclosure.

Various difficulties of the prior art are overcome by the present invention which is disclosed in a form in which two pieces of the pipe or the like are sealed together by two one-piece sealing rings which cooperate with annular corners formed by recesses at the ends of the pipe. The sealing rings have tapered annular sealing surfaces and the pipe ends are so recessed that a more or less square annular corner on the pipe engages each of the sealing surfaces on the rings. The construction is such that the annular corners on the pipe ends exert pressure on the inclined surfaces of the sealing rings and slide over such surfaces as the ends of the pipe are drawn together. In this way the annular corners on the ends of the pipe are lapped into sealing fit with the sealing surfaces of the rings. One ring has its sealing surfaces on its interior and the other ring has its sealing surfaces on its exterior so that as the pipe ends are drawn together one ring is circumferentially expanded as a unit and the other ring is circumferentially contracted as a unit. The rings are preferably resilient, which causes a heavy permanent sealing pressure to be exerted over the contacting area between the sealing surfaces of the rings and the annular corners of the pipe that have been lapped into sealing fit with the rings.

Fig. 1 is a fragmentary sectional view taken longitudinally of the pipe, showing one form of the invention with the parts assembled preparatory to making the joint.

Fig. 2 is a view similar to Fig. 1 showing the completed joint.

Fig. 3 is a fragmentary sectional view taken longitudinally of the pipe showing a completed joint embodying a slightly modified form of the invention.

Fig. 4 is a fragmentary sectional view taken longitudinally of the pipe showing a completed joint embodying a second modification of the invention.

Fig. 5 is a fragmentary sectional view taken longitudinally of the pipe showing a third modification of the invention, with the parts assembled preparatory to making the joint.

Fig. 6 is a view similar to Fig. 5 showing the completed joint.

Reference will now be had to Figs. 1 and 2. Sections of pipe 1 and 2 are provided with suitable means for drawing the ends together, such as ends or fittings having flanges 4 and 5 adapted to be drawn together by bolts 6, as is well understood in the art. The flanges are provided with annular recesses so formed that at the end surfaces of the flanges there are more or less square annular corners 7, 8, 9 and 10. Sealing rings 11 and 12 have inclined sealing surfaces 14, 15, 16 and 17 which engage the corners 7, 8, 9, and 10 respectively. Each of these rings is a continuous solid ring of metal, preferably similar to the metal of the pipe. The metal of the rings is preferably resilient and is preferably malleable or worked metal or ductile metal; and the rings are of such material and so proportioned that upon sufficient pressure being applied to the inclined sealing surfaces the ring either expands circumferentially as a unit or contracts circumferentially as a unit, as the case may be.

The parts are initially assembled as shown in Fig. 1 and then the flanges 4 and 5 are drawn together by bolts 6. This causes the corners 7, 8, 9, and 10 to exert pressure on the sealing surfaces 14, 15, 16 and 17, respectively; and as the flanges are drawn together, the corners 7, 8, 9, and 10 slide over the inclined sealing surfaces on the sealing rings while exerting considerable pressure on those surfaces. This sliding of surfaces under pressure causes local action on the metal of the sliding surfaces, which is in effect a local cold working that somewhat densifies the surface metal; it also so removes machining irregularities as to produce a sealing fit capable of withstanding high pressure. This local action by which the sealing fit is produced is a lapping action. The pressure exerted on the surfaces 14 and 15 by the corners 7 and 9 also contracts the ring as a unit and thus permanent sealing pressure is established at the corners 7 and 9. Similarly the pressure exerted on the surfaces 16 and 17 by the corners 8 and 10 expands the ring 12 as a unit so that permanent sealing pressure is exerted on the corners 8 and 10. When I say the ring is expanded as a unit, or contracted as a unit, I mean that the ring is expanded (or contracted) throughout its entire length. In fact, in actual practice with rings of the proportions shown in the drawings, the geometrical configuration of the ring's cross section (taken as in the drawings) is maintained insofar as the eye can detect, but the entire circumference of the ring is increased or diminished as the case may be. In such a case, the geometrical change in the ring, in actual practice, is similar in kind (not necessarily degree) to the geometrical change caused by a change in temperature of the ring.

In the finished joint, as shown in Fig. 2, the corners 7 and 9 are located near the annular apex formed by surfaces 14 and 15, and the ring 11 has been so contracted that its circumference is appreciably less than its normal circumference (i. e. original circumference). Similarly, the corners 8 and 10 are located near the annular apex formed by the surfaces 16 and 17, and the ring 12 has been so expanded as a unit that its circumference is appreciably greater than its normal circumference. The resiliency of the rings causes them to exert heavy pressures on the annular corners, and since the area of contact between the inclined surfaces on the rings and the corners is quite small, the sealing pressure per unit area is very large. If desired, a collar 18 may be placed around each of the bolts 6 so that in the completed joint the flanges 4 and 5 abut against the ends of the collars 18. Thus, the collars 18 accurately predetermine the final position of the parts and aid in forming a rigid mechanical connection between the two sections of pipe independently of the sealing rings 11 and 12. Any bending stresses which may be put upon the pipe are resisted at the joint by the bolted flanges, and hence such stresses cannot impair the seal.

In the modification shown in Fig. 3 sealing rings 20 and 21 are so proportioned relative to recesses 22 and 24 in the ends of the pipe that when the joint has been completed (as shown in Fig. 3) the rings 20 and 21 contact with each other (due to the expansion of ring 21 and the contraction of ring 20). In this way, the sealing rings mutually support and reenforce each other and add to the sealing pressure exerted at the corners. With this form of the invention a somewhat softer metal may be used for the sealing rings.

In the form of the invention shown in Fig. 4, two sections of pipe or the like which are to be joined are provided with ends or fittings having flanges 30 and 31 adapted to be drawn together by bolts 32. The opposing surfaces of the flanges are each provided with two recesses so that there is a pair of recesses which forms more or less square annular corners 34 and 35 adapted to engage inclined sealing surfaces on the interior of a sealing ring 36; and another pair of recesses which forms annular corners 37 and 38 adapted to engage inclined sealing surfaces on the exterior of a sealing ring 39. The parts are assembled and the flanges drawn together in a manner analogous to that used in the preceding examples. If desired, a collar 40 may be placed on each of the bolts to predetermine the final position of the two sections of pipe and to aid in forming a rigid mechanical connection between the two sections of pipe independently of the engagement of the annular corners with the tapered surfaces on the sealing rings. In the finished joint (as shown in Fig. 4) the interior sealing ring 39 has preferably been contracted into a condition in which its interior diameter is substantially equal to the interior diameter of the pipe. Preferably the normal interior diameter of this sealing ring is substantially larger than the interior diameter of the pipe. In this form of the invention pressure within the pipe is applied to the contracted sealing ring 39, thus tending to restore it to its normal condition and thereby adding to the sealing pressure at the corners 37 and 38.

The construction shown in Figs. 5 and 6 is similar to that shown in Figs. 1 and 2, but between sealing ring 50, which is to be contracted, and sealing ring 51, which is to be expanded, there is provided an abutment ring 53. This abutment ring is of such dimensions and material that it is not adapted to be either expanded or contracted. The parts are initially assembled as shown in Fig. 5, and then the pipe ends are drawn together by any suitable means, causing corners 54 and 55 to be lapped into sealing fit with the ring 50 and contract the ring 50 as a unit; and also causing corners 56 and 57 to be lapped into sealing fit with ring 51 and expand the ring 51 as a unit. In the finished joint (Fig. 6) the sealing ring 50 has been contracted into engagement with the abutment ring 53 and sealing ring 51 has been expanded into engagement with the abutment ring 53. It is apparent, therefore, that the abutment ring serves to reenforce each of the rings 50 and 51 and hence the rings 50 and 51 do not in themselves have to have sufficient strength to withstand the pressure placed in the pipe. In fact, this construction enables rings 50 and 51 to be made of somewhat softer material than would otherwise be feasible. Abutment ring 53 may be made of such length with reference to the depth of the recesses 58 and 59 that in the finished joint the ends of the ring 53 engage the bottoms of the recesses as shown in Fig. 6 and thus produce a certain amount of seal. This form of the invention produces a triple seal, first with the ring 51, second with the ring 53, and third with the ring 50.

Where a single sealing ring such as ring 12 (Fig. 1) is expanded, a heavy constricting pressure is placed upon the end of the pipe. However, by the use of a contracted ring in addition to the expanded ring, there is an expanding pressure that largely offsets the constricting pressure as far as the end of the pipe proper is concerned. Accordingly, the finished joint has the end of the pipe proper in a condition of approximately neutral stress. This characteristic of the present invention peculiarly adapts it for joining pipes having thin walls or made of relatively soft metal.

The wedging action which is exerted on the sealing rings as the joint is drawn up is one which has great mechanical advantage and hence large sealing pressures may be exerted with relatively small forces applied by the bolts or other means used to draw the pipe ends together. The amount of mechanical advantage obtained depends, of course, upon the angle of inclination of the sealing surfaces on the sealing rings. If a small angle be used, (i. e., measured from the axis of the pipe) a large mechanical advantage is obtained, but the sealing rings must have a relatively long length and the ends of the pipe must be moved a relatively large distance in order to obtain a given expansion or contraction of the ring, as the case may be. On the other hand, if the angle of the sloping surfaces be large, the conditions are just the reverse. An angle should be used as best suits the particular purpose, but I have found that for many purposes an angle of 16 degrees is satisfactory, since it is very desirable that the rings be short measured axially of the pipe.

In practice there is a maximum permissible pull which can be exerted by the bolts, and hence there is a corresponding limit to the cross sectional area of the rings. In other words, if the cross sectional area of the rings be too great, the maximum permissible pull of the bolts will not be sufficient to effect the expansion and contraction of the rings. Hence, making the rings short enables them to be made thick, and thick rings will withstand higher pipe line pressures than thin rings. The length of the rings and the angle of the sealing surfaces should be such as to take care of manufacturing variations in the size of the rings and the size of the pipe ends, i. e., to insure that the parts will readily start together and that complete drawing up of the pipe ends will effect sufficient expansion and contraction of the rings and adequate lapping of the sealing surfaces.

As the parts are assembled preparatory to drawing up the joint the sealing rings are floating and act to automatically align the pipe ends with each other and with the sealing rings. The contacting surfaces are so effectively lapped into a sealing fit that ordinary commercial machining methods are sufficiently accurate in making the parts and the joint does not require great care in assembly. In fact, in actual practice a fluid tight seal is obtained by the time a fraction of the lapping movement has been completed.

The exact dimensions and material of the rings are not important so long as they are such as to permit the rings to act as above described. In general, the material of the rings must have elasticity and is preferably malleable or worked metal, or ductile metal, similar to or somewhat softer than, the pipes to be joined. The ring which is expanded should have tensile strength, and the ring which is contracted should have compressive strength. Steel rings may be used for steel pipe and brass rings for brass pipe. Either steel or brass rings might be used for cast iron pipe. With the form of the invention shown in Figs. 3, 5, and 6, somewhat softer metals, such as copper, may be used for the sealing rings. The cross sectional proportions of the rings (i. e. axial length to cross axial thickness) and the material of the rings are such that the rings expand as a unit (or contract as a unit) when pressure is applied to the sealing surfaces, as has previously been pointed out, but the exact proportions and dimensions of the rings may be varied considerably. The rings may have a thickness slightly less than the thickness of the pipe and a length slightly greater than twice their thickness.

It is realized that the present invention may assume forms other than those specifically disclosed and may be used for purposes other than connecting together sections of pipe. Accordingly, the present disclosure is to be considered as illustrative, in compliance with the patent statutes, and is not to be considered as limiting.

Having described my invention, what I claim is:

1. A fluid tight joint structure comprising two elements to be joined, the elements being provided with two pairs of annular corners, one pair of which is adapted to expand a sealing ring and the other pair of which is adapted to contract a sealing ring as the said elements are moved toward one another; a sealing ring having inclined annular surfaces contacting with one pair of corners; a second and separate sealing ring having inclined annular surfaces contacting with the other pair of corners; and means to move said elements toward one another to lap the corners into sealing fit with the rings and to expand one ring as a unit and contract the other ring as a unit, each of said rings having such length and thickness and appropriate inclined surfaces, whereby they change in diameter as units and effect the stated lapped seal joints with the elements in the assembly.

2. A fluid tight joint structure comprising two elements to be joined, said elements being provided with two pairs of annular corners; means holding the two elements together; a sealing ring having a pair of inclined surfaces in sealing engagement with one of said pairs of corners, said ring being held in a circumferentially contracted condition by pressure applied by the contacting corners; and a second and separate sealing ring having a pair of inclined surfaces in sealing engagement with the second pair of corners, said second sealing ring being held in circumferentially expanded condition by pressure applied by the second pair of corners, each of said rings having such length and thickness and appropriate inclined surfaces, whereby they change in diameter as units and effect the stated lapped seal joints with the elements in the assembly.

3. A fluid tight joint structure comprising two elements to be joined, the elements being provided with two pairs of annular corners; a sealing ring having inclined annular surfaces contacting with one pair of corners; a second and separate sealing ring having inclined annular surfaces contacting with the other pair of corners; and means to move said elements relative to the sealing rings to lap the corners into sealing fit with the inclined surfaces of the rings, each of said rings having such length and thickness and appropriate inclined surfaces, whereby they change in diameter as units and effect the stated lapped seal joints with the elements in the assembly.

4. A fluid tight joint structure comprising two elements to be joined, the elements being provided with two pairs of annular corners, one pair of which is adapted to expand a sealing ring and the other pair of which is adapted to contract a sealing ring as the said elements are moved toward one another; a sealing ring having inclined annular surfaces contacting with one pair of corners; a second and separate sealing ring having inclined annular surfaces contacting with the other pair of corners; means to move said elements toward one another to lap the corners into sealing fit with the rings and to expand one ring as a unit and contract the other ring as a unit; and means to predetermine the final position of said elements independently of the contact of the corners with the surfaces of the sealing rings, each of said rings having such length and thickness and appropriate inclined surfaces, whereby they change in diameter as units and effect the stated lapped sealed joints with the elements in the assembly.

5. A fluid tight joint structure comprising two elements to be joined, said elements being provided with two pairs of annular corners; means holding the two elements together; a sealing ring having a pair of inclined surfaces in sealing engagement with one of said pairs of corners, said ring being held in circumferentially contracted condition by pressure applied by the contacting corners; and a second and separate sealing ring having a pair of inclined surfaces in sealing engagement with the second pair of corners, said second sealing ring being held in circumferentially expanded condition by pressure applied by the second pair of corners; each of said rings being supported against the forces which hold it in its changed condition, each of said rings having such length and thickness and appropriate inclined surfaces, whereby they change in diameter as units and effect the stated lapped seal joints with the elements in the assembly.

6. A fluid tight joint structure comprising two elements to be joined, the elements being provided with two pairs of annular corners, one pair of which is adapted to expand a sealing ring and the other pair of which is adapted to contract a sealing ring as the said elements are moved toward one another; a sealing ring having inclined annular surfaces contacting with one pair of corners; a second sealing ring having inclined annular surfaces contacting with the other pair of corners; an abutment ring positioned between said sealing rings; and means to move said elements toward one another to lap the corners into sealing fit with the sealing rings and to expand one sealing ring as a unit and contract the other sealing ring as a unit.

7. A fluid tight joint structure comprising two elements to be joined, the two elements being recessed to provide two pairs of annular corners; means holding the two elements together; a sealing ring having a pair of inclined surfaces in sealing engagement with one of said pairs of corners; a second sealing ring having a pair of inclined surfaces in sealing engagement with the second pair of corners; and an abutment ring positioned between said sealing rings, the ends of the abutment ring engaging the bottoms of said recesses.

8. A fluid tight joint structure comprising two sections of pipe provided with flanged ends, said ends being recessed to provide two pairs of annular corners; a sealing ring having inclined annular surfaces on its exterior contacting with one pair of corners; a second and separate sealing ring having inclined annular surfaces on its interior contacting with the other pair of corners; and means to draw the flanges toward one another to lap the corners into sealing engagement with the sealing rings and circumferentially contract one ring and circumferentially expand the other ring, each of said rings having such length and thickness and appropriate inclined surfaces, whereby they change in diameter as units and effect the stated lapped seal joints with the elements in the assembly.

9. A fluid tight joint structure comprising two elements to be joined, the elements collectively being provided with at least two annular corners, one of which is adapted to expand a sealing ring and the other of which is adapted to contract a sealing ring as the said elements are moved toward one another; a sealing ring having an inclined surface contacting with a corner on one element, said ring also contacting with the other element; a second and separate sealing ring also having an inclined surface contacting with a corner on one element, said second ring also contacting with the other element; and means to move the elements toward one another to circumferentially expand one ring and circumferentially contract the other ring and thereby lap each of the rings into sealing fit with each of said elements, each of said rings having such length and thickness and appropriate inclined surfaces, whereby they change in diameter as units and effect the stated lapped seal joints with the elements in the assembly.

10. A fluid tight joint structure comprising two elements to be joined, the elements being provided with two pairs of annular corners, one pair of which is adapted to expand a sealing ring and the other pair of which is adapted to contract a sealing ring as the said elements are moved toward one another; a sealing ring having inclined annular surfaces contacting with one pair of corners; a second and separate sealing ring having inclined annular surfaces contacting with the other pair of corners; an abutment ring positioned between said sealing rings; and means to move said elements toward one another to lap the corners into sealing fit with the sealing rings and to expand one sealing ring as a unit and contract the other sealing ring as a unit, each of said rings having such length and thickness and appropriate inclined surfaces, whereby they change in diameter as units and effect the stated lapped seal joints with the elements in the assembly.

11. A fluid tight joint structure comprising two elements to be joined, the two elements being recessed to provide two pairs of annular corners; means holding the two elements together; a sealing ring having a pair of inclined surfaces in sealing engagement with one of said pairs of corners; a second and separate sealing ring having a pair of inclined surfaces in sealing engagement with the second pair of corners; and an abutment ring positioned between said sealing rings, the ends of the abutment ring engaging the bottoms of said recesses, each of said rings having such length and thickness and appropriate inclined surfaces, whereby they change in diameter as units and effect the stated lapped seal joints with the elements in the assembly.

In testimony whereof I affix my signature.

WYLIE G. WILSON.